United States Patent [19]

Kothmann

[11] 4,292,379
[45] Sep. 29, 1981

[54] VARIABLE AREA FUEL CELL PROCESS CHANNELS

[75] Inventor: Richard E. Kothmann, Churchill Borough, Pa.

[73] Assignee: Westinghouse Electric Corp., Pittsburgh, Pa.

[21] Appl. No.: 144,088

[22] Filed: Apr. 28, 1980

[51] Int. Cl.³ ............................................. H01M 8/04
[52] U.S. Cl. ...................................... 429/17; 429/34; 429/210
[58] Field of Search ................. 428/131, 136; 429/17, 429/34, 38, 39, 12, 210

[56] References Cited

U.S. PATENT DOCUMENTS

| 3,160,528 | 12/1964 | Dengler et al. | 136/86 |
| 3,432,357 | 3/1969 | Dankese | 136/86 |
| 3,468,712 | 9/1969 | Gillespie | 136/86 |
| 4,169,917 | 10/1979 | Baker et al. | 429/26 |
| 4,182,795 | 1/1980 | Baker et al. | 429/13 |

Primary Examiner—Charles F. LeFevour
Attorney, Agent, or Firm—Edward L. Levine

[57] ABSTRACT

A fuel cell arrangement having a non-uniform distribution of fuel and oxidant flow paths, on opposite sides of an electrolyte matrix, sized and positioned to provide approximately uniform fuel and oxidant utilization rates, and cell conditions, across the entire cell.

11 Claims, 3 Drawing Figures

VARIABLE AREA FUEL CELL PROCESS CHANNELS

GOVERNMENT CLAUSE

This invention was made or conceived in the course of, or under, a contract with the United States Government, identified as ET-78-C-03-2031.

CROSS-REFERENCE TO RELATED APPLICATIONS

This disclosure is closely related to concurrently-filed U.S. patent application in the name of R. E. Kothmann entitled, "Variable Area Fuel Cell Cooling", further identified as Ser. No. 144090, and concurrently filed U.S. Patent Application in the name of R. E. Kothmann and J. A. Cyphers, intitled "Fuel Cell System Configuration", further identified as Ser. No 144,089, both of which are hereby incorporated by reference.

BACKGROUND OF THE INVENTION

1. Description of the Prior Art

Among the various types of fuel cell systems are those which include subassemblies of two bipolar plates between which are supported electrodes and an acid electrolyte in a matrix. The subassemblies, herein referred to as fuel cells, are oriented one atop, or aside another, and electrically connected in series, or otherwise, to form what is commonly referred to as a fuel cell stack. Process channels are provided in the bipolar plates, adjacent to the electrodes, so that fuel flows through one set of process channels and an oxidant flows through another set of channels.

In typical bipolar plate fuel cell constructions, the fuel and oxidant streams flow on opposite sides of the electrolyte matrix at 90° angles to one another, commonly referred to as a cross-flow geometry. The oxidant and fuel channels are symmetrically and evenly distributed, that is, a repeating selected channel shape is evenly spaced across the cells. It has now been recognized that as the fuel or oxidant traverses these channels, the desired electrochemical reaction takes place, accordingly depleting the fuel or oxidant. The fuel and oxidant are fresh at the respective inlet ends of the process channels, and progressively degrade to a minimum at the cell exit. The progressive depletion accordingly affects the electrochemical reaction rate across the cell. Further, as a result of the approximate 90° cross-flow orientation, a typical rectangular cell presents one corner exposed to both fresh fuel and fresh oxidant, while the diagonally opposite corner is exposed to both depleted fuel and depleted oxidant. Thus, the entry corner tends to develop a higher EMF than the exit corner, and this change occurs gradually across the entire cell. At specific locations across the cell an imbalance is thus created between the degree of depleted fuel and the depleted oxidant.

The resulting uneven reaction distribution is undesirable for several reasons, including unbalanced effects upon current, resistance and temperature throughout an individual fuel cell and a fuel cell stack. For example, if depletion of either oxidant or fuel is complete to the extent that the electrochemical reaction locally ceases, that position within the cell tends to reverse the reaction, substantially effecting cell output and overall system efficiency. While excessive amounts of fuel and oxidant can be passed through the process channels to eliminate this possibility, there still remains an uneven reaction distribution and additionally an efficiency penalty from the mechanical power required to pump the reactants.

It is therefore desirable to provide fuel cell systems which alleviate the uneven reaction occurring across the fuel cells.

SUMMARY OF THE INVENTION

This disclosure provides fuel cell system structures and arrangements which alleviate the uneven reaction distribution and associated effects typical of existing fuel cell arrangements. Whereas prior arrangements utilize process channels which are of constant flow and surface area, the process channels in accordance with this invention vary in a manner such that more fuel is provided in the fuel channels nearest the fresh oxidant channel inlets, and less fuel is provided in the fuel channels nearest the depleted oxidant channel outlets. Similarly, the oxidant channels provide more oxidant flow near the fresh fuel inlets, and less oxidant flow near the depleted fuel outlets.

In preferred form, the channels are defined by generally rectangular bipolar plates in a cross flow geometry. The fuel channels are parallel and coextending, as are the oxidant channels. The flow and surface area is varied by providing, for example, larger rectangular shaped fuel channels which progressively decrease to smaller rectangular channels. Additionally, similar or differing channels can be unevenly spaced to achieve a more balanced reactor rate across a fuel cell.

BRIEF DESCRIPTION OF THE DRAWINGS

In advantages, nature and additional features of the invention will become more apparent from the following description, taken in connection with the accompanying drawings, in which.

DESCRIPTION OF THE PREFERRED EMBODIMENTS

Figure 1:
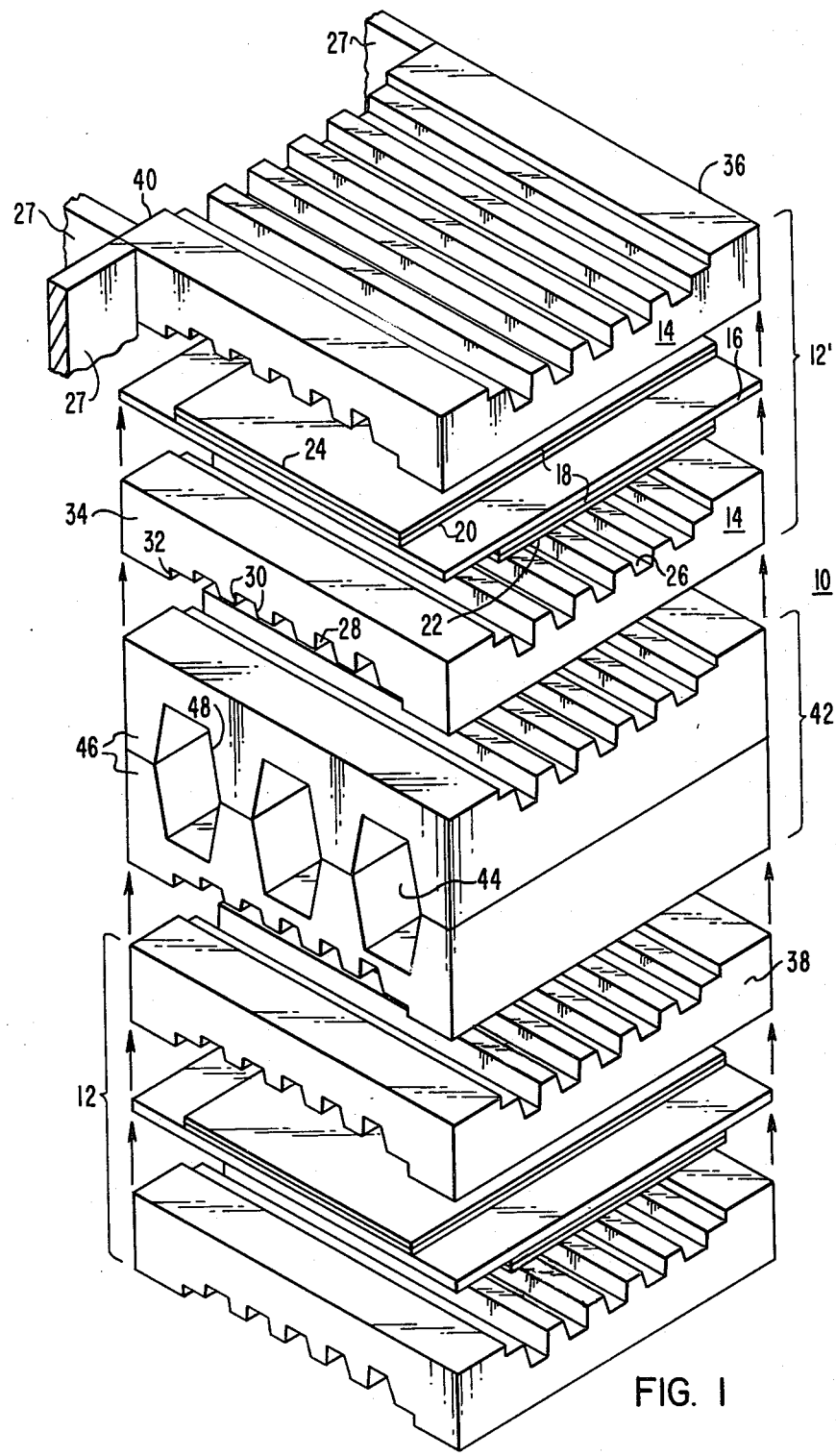
FIG. 1 is an expanded perspective view of a fuel cell stack in accordance with the invention.

Referring now to FIG. 1, there is shown an electrochemical fuel cell system 10 in accordance with the invention. The system includes a plurality of repeating fuel cells 12 arranged in a stack such that the cells 12 are electrically connected in series. Cell stacks can also be arranged in parallel.

An individual cell, such as the cell 12', includes two bipolar plates 14 between which are sandwiched an electrolyte, for example, in the form of a porous graphite matrix 16 saturated with an acid such as phosphoric acid. Many other materials and structures which incorporate an electrically insulating material can also be utilized. The plates 14 can comprise a material such as compression molded graphite-resin composite, disposed on opposite sides of the electrolyte matrix 16 and electrodes 18, such as the cathode 20 and anode 22. Each electrode 18 can also be of a porous graphite material provided with a porous graphite fiber backing 24 for added structural integrity.

The bipolar plates 14 are provided with a set of process channels, including the fuel channels 26 and the oxidant channels 28. The channels 26, 28 are preferably generally rectangular in cross-section with slightly-slanted edges 30 to facilitate fabrication as necessary, for example, to remove a frabrication die. The geometry and/or the spacing among the channels 26, 28 is varied, as discussed more fully hereinafter. The bipolar plates 14 also include grooves 32 matingly configured to receive the electrodes 18. Thus, when held together by means well known, such as bonding materials or an external frame, each cell represents a substantially sealed unit.

An oxidant, such as a hologen, or air or other oxygen-containing material, flows through the oxidant channels 28, and a fuel, such as hydrogen, organics or metals, flows through the fuel channels 26. Manifolds 27 are typically utilized to, for example, provide oxidant to the oxidant inlet side 34 of the cell system stack and to receive the oxidant from the oxidant outlet side 36 of the stack. Similarly, manifolds are provided on the fuel inlet side 38 and fuel outlet side 40. Electrical power and heat are generated by the interaction of the fuel and oxidant through the electrodes and electrolyte matrix 16. An exemplary fuel cell 12 utilizes hydrogen fuel, air as the oxidant and phosphoric acid as the electrolyte.

A substantial amount of heat is generated by the electrochemical reaction and, accordingly, the system stack 10 includes cooling modules 42. Dependent upon the operating temperature desired, the cooling modules 42 are placed between fuel cells 12 at selected positions within the stack 10. The preferred cooling modules are discussed more fully in the referenced concurrently filed application (Ser. No. 144,090). The cooling module 42 includes cooling passages 44 which are preferably oriented generally parallel to the oxidant channels 28, although they can also be oriented parallel to the fuel channels 26. The latter, however, requires more complex manifolding. A cooling fluid flows through the cooling passages 44. In preferred form, the cooling fluid and oxidant are the same medium, such as air. Thus, with the configuration shown, air is brought from a singular manifold 27 to the oxidant inlet side 34 of the fuel cell system stack 10, and flows in parallel and in the same direction through the cooling passages 44 and oxidant process channels 28.

Figure 2:
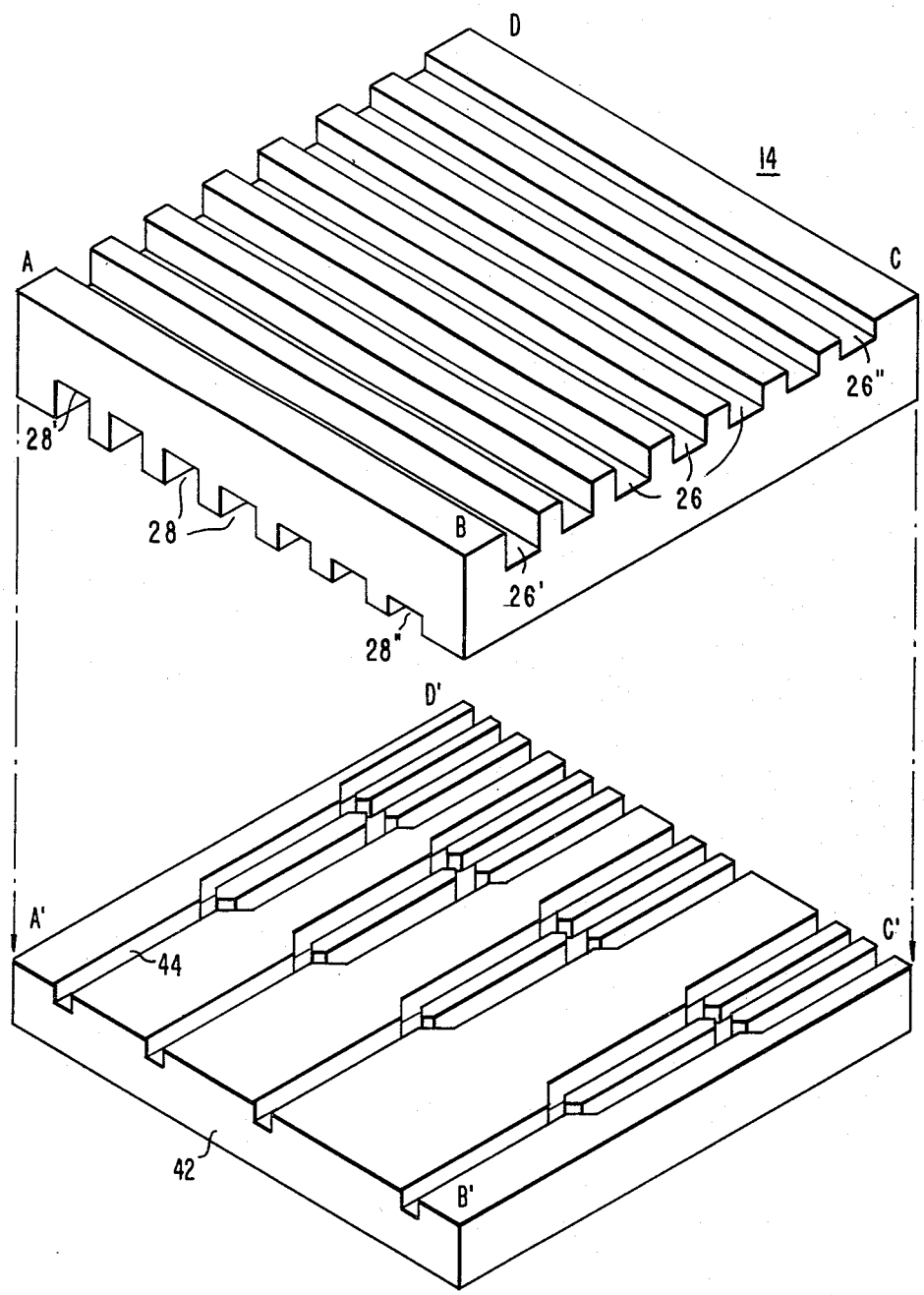
FIG. 2 is a schematic perspective view of a portion of a fuel cell stack, including a singular bipolar plate and a portion of a cooling module.
Figure 3:
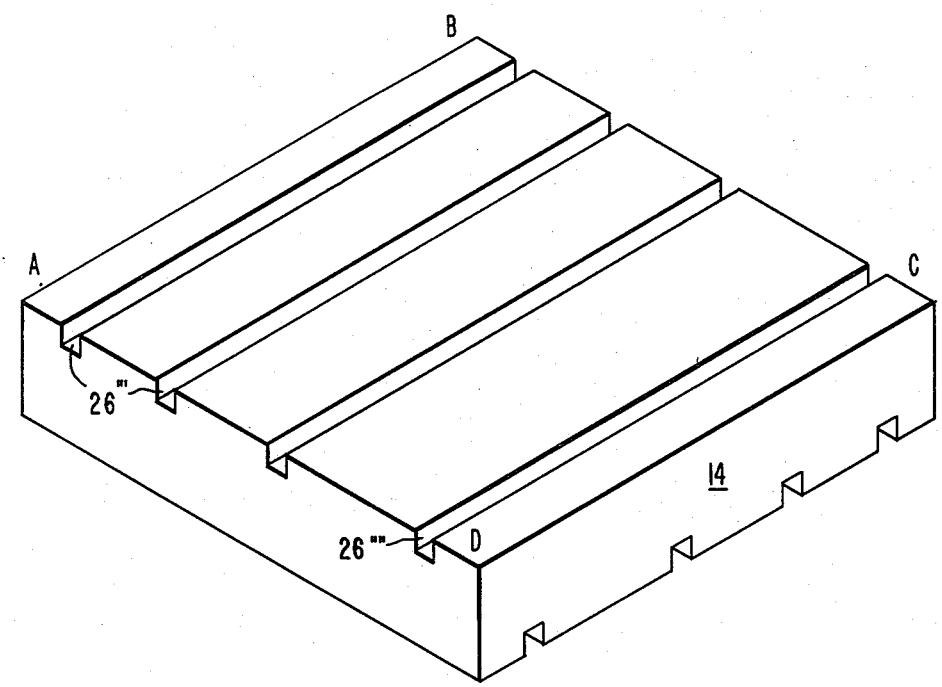
FIG. 3 is a perspective view of another embodiment of a bipolar plate.

In order to obtain a more uniform fuel utilization factor and improved current density and temperature distributions, the fuel channels 26 and oxidant channels 28 are unevenly sized or unevenly distributed, providing a variation among channels in flow volume and/or channel surface area adjacent the electrolyte, as shown best in FIG. 2. Reference letters A, B, C, and D denote, for descriptive purposes, the four corners of the exemplary bipolar plate 14, although shapes other than rectangular are also possible, as discussed more fully in the referenced concurrently filed application (Ser. No. 144,089). As shown, fuel channels 26 are larger at the AB side of the plate and decrease in steps, or continuously, approaching side CD. Accordingly, fuel channel 26' is larger than fuel channel 26''. The oxidant channels 28 are largest at the AD side of the bipolar plate, and decrease as the BC side of the plate is approached. Accordingly, oxidant channel 28' is larger than oxidant channel 28''. Additionally, as shown in FIG. 3, the fuel and oxidant channels can be unevenly spaced so that, for example, fuel channels 26''' are closely spaced approaching side AB, and fuel channels 26'''' are spaced farther apart approaching side CD.

With the exemplary bipolar plate 14 of FIG. 2, where the channels are uniformly spaced, the channels near the inlet sides of the plates 14 will require approximately 20 to 30% higher than average flow rates for both fuel and oxidant to achieve relatively uniform exit compositions.

For the exemplary bipolar plate 14, and assuming laminar flow conditions and similar pressure drops through the respective uniformly-spaced channels, the ratio of the flow rate in any channel i to the flow rate in the average channel is $$\frac{\dot{m}_i}{\dot{m}} = \left(\frac{a_i}{a}\right)^4 \frac{\phi(\alpha)}{\phi(\alpha_i)}$$

where
$\alpha = a/b$
$\alpha_i = a_i/b$
$\phi(\alpha) = \alpha(1+\alpha)^2 (57.2 + 38.8(1-\alpha)^3)$
$a$ = height of the average channel
$a_i$ = height of channel i,
$b$ = width of the average channel, and
$b$ = width of channel i Table I presents the ratio:

$$\left(\frac{\dot{m}_i}{\dot{m}}\right)$$

of channel flow rates for various channel heights, $a_i$, where the average channel height, $a$, equals 0.045 inches and the average channel width, $b$, is 0.060 inches.

TABLE I

| $a_i$ | $\dfrac{\dot{m}_i}{\dot{m}}$ |
|---|---|
| .030 | 0.38 |
| .033 | 0.48 |
| .036 | 0.59 |
| .039 | 0.72 |
| (~ .040 | 0.75) |
| .042 | 0.86 |
| .045 | 1.00 |
| .048 | 1.15 |
| (~ .050 | 1.25) |
| .051 | 1.31 |
| .054 | 1.48 |
| .057 | 1.65 |
| .060 | 1.83 |

Thus, in order to achieve 25% higher than average fuel flow near side AB, and 25% lower than average fuel flow near side CD, fuel channels 26 approximately 0.050 inches by 0.060 inches are used near side AB, and channels approximately 0.040 inches by 0.060 inches are used near side CD.

The disclosed bipolar plate arrangement will advantageously result in a fuel cell performance improvement, particularly where the fuel stream, for example, hydrogen, contains small amounts of carbon monoxide with about 25% carbon dioxide. Such conditions cause the CO concentration at the exit, BC, to average approximately $2\frac{1}{2}$ times the inlet concentration for a 0.8 utilization factor, and a much higher concentration near corner B if only uniform channels, as previously taught, are utilized. The combined effect of limiting the CO increase as a result of larger, variable area channels, and the higher temperature near corner B due to a higher fuel supply, will reduce performance loss due to CO poisoning. Poisoning of typical catalysts by carbon monoxide is temperature dependent, and tends to be excessive below approximately 350° F.

In order to further enhance the cell operation, a cooling module 42 as disclosed in the referenced concurrently filed application (Ser. No. 144,090) and exemplified in FIG. 2, can be utilized. The number of cooling channels 44 per unit area are preferably reduced by aproximately 30% to 50% towards the fuel exit end B' C' of the cell. The disclosed fuel cell arrangement including a non-uniform distribution of oxidant and fuel will result in higher fuel utilization, more uniform cell operating temperatures, lower oxidant stoichiometric flow requirements and reduced catalyst poisoning.

Since numerous changes may be made in the abovedescribed arrangements without departing from the spirit and scope thereof, it is intended that all matter contained in the foregoing description and drawings be interpreted as illustrative, and not in a limiting sense.

I claim:

1. An improved fuel cell of the type wherein a fuel is passed through a plurality of fuel channels on one side of an electrolyte from a fuel inlet to a fuel outlet, and an oxidant is passed through a plurality of oxidant channels on the other side of the electrolyte from an oxidant inlet to an oxidant outlet, said fuel and oxidant channels arranged so that one of said fuel channel inlets is positioned closer to said oxidant channel inlets than another one of said fuel channel inlets, and one of said oxidant channel inlets is positioned closer to said fuel channel inlets than another one of said oxidant channel inlets, the improvement comprising:

the flow area of one of said fuel channels being different than the flow area of another one of said fuel channels, and the flow area of one of said oxidant channels being different than the flow area of another one of said oxidant channels.

2. The fuel cell of claim 1 wherein the flow area of said one fuel channel is smaller than the flow area of said another fuel channel, said one fuel channel corresponding to a fuel channel inlet farther from said oxidant channel inlets, and wherein the flow area of said one oxidant channel is smaller than the flow area of said another oxidant channel, said one oxidant channel corresponding to an oxidant inlet farther from said fuel channel inlets.

3. A bipolar plate for a fuel cell comprising a plate having a plurality of fuel channels on one side thereof and a plurality of oxidant channels on the opposite side, the size of said fuel channels varying in a predetermined fashion from one to another, and the size of said oxidant channels varying in a predetermined fashion from one to another.

4. The bipolar plate of claim 3 wherein said fuel channels are parallel and coextending, and said oxidant channels are parallel and coextending.

5. A bipolar plate for a fuel cell comprising a plate having a plurality of spaced fuel channels on one side thereof and a plurality of spaced oxidant channels on the opposite side, the spacing among respective fuel channels varying in a predetermined fashion, and the spacing among respective oxidant channels varying in a predetermined fashion.

6. The bipolar plate of claim 5 wherein said fuel channels are parallel and coextending and said oxidant channels are parallel and coextending.

7. A fuel cell comprising an electrolyte, an anode and a cathode disposed between two generally rectangular bipolar plates, said plates defining fuel channels on one side of said electrolyte and oxidant channels on the other side of said electrolyte, said fuel channels extending from a first inlet side of said rectangular plates to a second opposite outlet side, said oxidant channels extending from a third inlet side of said plates to a fourth opposite outlet side, the flow area defined by said fuel channels varying from one fuel channel to another in a predetermined manner, and the flow area defined by said oxidant channels varying from one oxidant channel to another in a preselected manner.

8. The fuel cell of claim 7 wherein the flow area of said fuel channels varies from a larger area at the corner of said plates which is adjacent said third oxidant inlet side to a smaller area at the corner of said plates which is adjacent said fourth oxidant outlet side, and wherein the flow area of said oxidant channels varies from a larger area at the corner of said plates which is adjacent said first fuel inlet side to a smaller area at the corner of said plates which is adjacent said second fuel outlet side.

9. A fuel cell system comprising an electrolyte, an anode and a cathode disposed between two bipolar plates, said plates defining fuel channels on one side of said electrolyte and oxidant channels on another side of said electrolyte, said fuel and oxidant channels each having an inlet and an outlet, said channels sized and configured to vary in a predetermined manner such that more fuel is passed through the fuel channels nearest the oxidant channel inlets than is passed through the fuel channels nearest the oxidant channel outlets, and more oxidant is passed through the oxidant channels nearest the fuel channel inlets than is passed through the oxidant channels nearest the fuel channel outlets, means for providing fuel to said fuel channel inlets and means for providing oxidant to said oxidant channel inlets.

10. A fuel cell system comprising an electrolyte, an anode and a cathode disposed between two bipolar plates, said plates defining fuel channels on one side of said electrolyte and oxidant channels on another side of said electrolyte, said fuel and oxidant channels each having an inlet and an outlet, said fuel channels sized and configured to vary in a predetermined manner such more fuel is passed through the fuel channels nearest the oxidant channels inlets than is passed through the fuel channels nearest the oxidant channel outlets, means for providing fuel to said fuel channel inlets and means for providing oxidant to said oxidant channel inlets.

11. A fuel cell system comprising an electrolyte, an anode and a cathode disposed between two bipolar plates, said lates defining fuel channels on one side of said electrolyte and oxidant channels on another side of said electrolyte, said fuel and oxidant channels each having an inlet and an outlet, said oxidant channels sized and configured to vary in a predetermined manner such that more oxidant is passed through the oxidant channels nearest the fuel channel inlets than is passed through the oxidant channels nearest the fuel channel outlets, means for providing fuel to said fuel channel inlets and means for providing oxidant to said oxidant channel inlets.

* * * * *